United States Patent [19]

Kotani et al.

[11] Patent Number: 4,764,951
[45] Date of Patent: Aug. 16, 1988

[54] AUTO DIALER FOR USE WITH TELECOPIERS OR THE LIKE

[75] Inventors: Matahira Kotani, Nara; Motohiko Hayashi, Ikoma; Shigeari Yasuda, Yamatokoriyama; Yuzoh Oi, Sakai, all of Japan

[73] Assignee: Sharp Kabushiki Kaisha, Osaka, Japan

[21] Appl. No.: 666,774

[22] Filed: Oct. 31, 1984

[30] Foreign Application Priority Data

Oct. 31, 1983 [JP] Japan ................ 58-206519

[51] Int. Cl.⁴ .................... H04M 11/00; H04N 1/00
[52] U.S. Cl. ................... 379/100; 379/355; 379/354; 358/257
[58] Field of Search ........... 179/2 DP, 90 B, 90 BD; 358/257; 379/93, 100, 355, 356, 354

[56] References Cited

U.S. PATENT DOCUMENTS

| | | | |
|---|---|---|---|
| 3,885,108 | 5/1975 | Zock | 179/90 B |
| 3,943,300 | 3/1976 | Stevenson | 179/2 DP X |
| 4,113,992 | 9/1978 | Gorham et al. | 179/90 B |
| 4,143,243 | 3/1979 | Sutton | 179/90 B |
| 4,277,651 | 7/1981 | Fisher, II et al. | 179/90 BD X |
| 4,503,288 | 3/1985 | Kessler | 179/2 DP |
| 4,581,656 | 4/1986 | Wada | 358/87 |

FOREIGN PATENT DOCUMENTS

| | | | |
|---|---|---|---|
| 64261 | 11/1982 | European Pat. Off. | 179/2 DP |
| 2078465 | 1/1982 | United Kingdom | 179/2 DP |
| 2141904 | 1/1985 | United Kingdom | 179/2 DP |

OTHER PUBLICATIONS

Hank Strubel, "Intelligent Telephone Sets," *Telecommunications,* Dec. 1980, pp. 59–61.

*Primary Examiner*—Keith E. George
*Attorney, Agent, or Firm*—Birch, Stewart, Kolasch & Birch

[57] ABSTRACT

A facsimile machine including an automatic dialer requiring no dial operation when calling up a specific addressee particularly an addressee requiring frequent communication, allows simplified transmission of the addressee's dial signal to the service line by using "one-touch" key operation, thus achieving an extremely simplified procedure for transmitting written messages therethrough. The automatic dialer is provided with a memory storing dial data of such a specific addressee requiring frequent communications. In response to the operation of a specific instruction key on the operation panel, the automatic dialer reads dial data from memory before delivery to the dial pulse generator circuit, which then outputs the dial pulses to the service line to activate transmission of a message through a telecopier such as a facsimile.

3 Claims, 2 Drawing Sheets

AUTO DIALER FOR USE WITH TELECOPIERS OR THE LIKE

BACKGROUND OF THE INVENTION

The present invention relates to an automatic dialer for use with telecopiers or the like such as a facsimile unit, more particularly, to such an automatic dialer having such a function to automatically dial specific addressees requiring frequent communications by using "one-touch" key operation.

Conventionally, when transmitting a telephone message, first, a dialing must be performed to call up the addressee by operating either a rotary dial or a pushbutton dial unit so that the dial signals can be transmitted through the telephone line. Some of conventional automatic dialers perform abbreviated dialing, for example, in order to call up a specific addressee by transmitting the dial signals denoting the addressee to the service line, and if the addressee is busy, another call is reactivated after a short while. Therefore, when transmitting a written message through a facsimile unit, the dial operation first calls up the addressee, and then after confirming the answerback signal from the addressee, the written message can be transmitted by operating the transmission button. Thus, any of the conventional units using abbreviated dialing still obliges the operator to carefully dial the addressee's number before correctly calling up a specific addressee.

OBJECT AND SUMMARY OF THE INVENTION

In the light of such an inconvenience in operating the existing dialing system, the present invention provides an automatic dialer that eliminates a number of dialing operations especially when calling up a specific addressee requiring frequent communications, by applying "one-touch" dial operation so that the addressee's dial signal can be transmitted through the line, thus effectively simplifying such a procedure needed for transmitting written messages through a telecopier such as a facsimile unit.

The preferred embodiment of the present invention provides an automatic dialer of a telecopier such as a facsimile unit, which contains memory storing the dial data of specific addressees requiring frequent communications. The preferred embodiment also provides means for transmitting specific dial data to the dial pulse generator circuit after reading the dial data from memory in response to the operation of a specific key on the operation panel, causing the dial pulse generator circuit to output a specific dial pulse to the service line so that the ensuing message transmission can be executed as usual. To achieve this, the preferred embodiment has made it possible to transmit the addressee's specific dial pulse signal by "one-touch" operation of a specific key without preliminarily memorizing the dial numbers of the pre-registered specific addressees requiring frequent communications. The preferred embodiment of the present invention thus provides an extremely simplified procedure needed for transmitting written messages through a telecopier such as a facsimile unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Referring now to the block diagram of FIG. 1, the configuration of an automatic dialer provided for a facsimile unit according to the preferred embodiment is described below.

Figure 1:
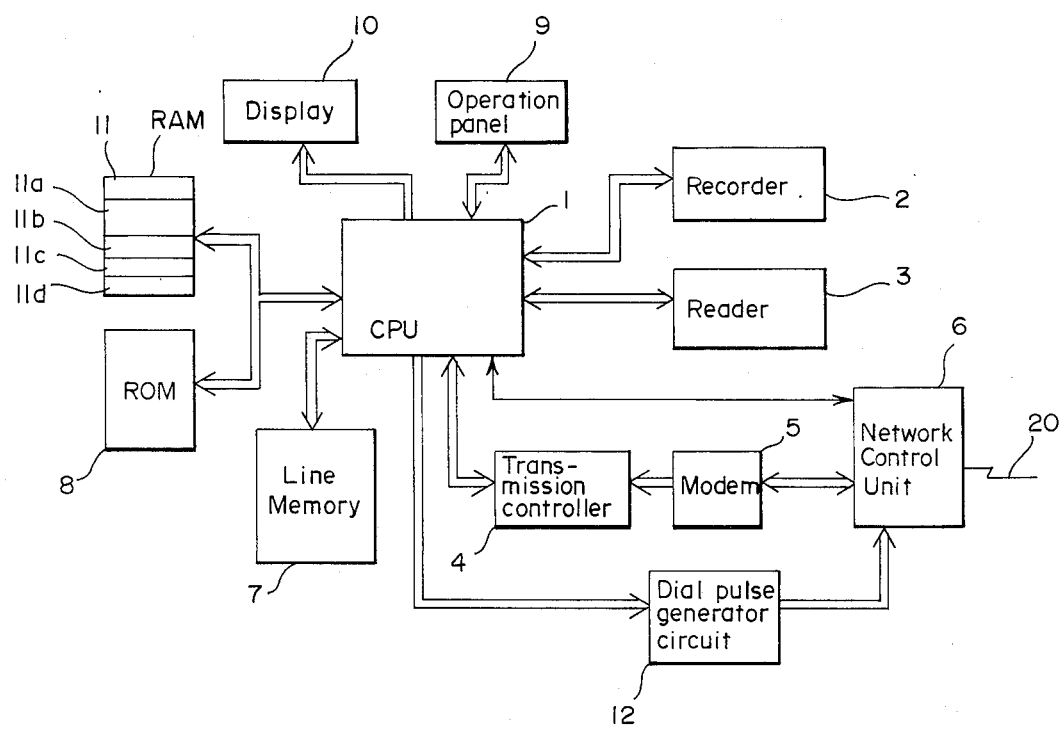
FIG. 1 shows the block diagram of a facsimile provided with the automatic dialer according to the preferred embodiment of the present invention.

In FIG. 1, reference number 1 indicates the controller unit (CPU) of the facsimile, which controls respective components in accordance with the sequence program stored in ROM 8. Reference number 2 indicates the recorder recording the picture data received. Reference number 3 indicates the picture reader reading the written message being transmitted. Reference number 4 indicates the transmission control circuit, 5 the modem, 6 the NCU (network control unit) connected to the service line 20, and reference number 7 the line memory storing several lines of the picture data being transmitted or received, respectively. All the operational data related to the control of signal transmission and reception are delivered to the CPU 1 through the NCU 6, modem 5, and the data transmission control circuit 4. The CPU 1 then delivers the received data to the line memory 7, where the data is provisionally stored. The stored data is then decoded into "run-length" codes before being developed into the picture data. The picture data is then delivered to the recorder 2, where the data is recorded line by line. Written data is read by the reader 3 during transmission, and then the picture data read by the reader 3 is delivered to the line memory 7 for storage by the instruction of the CPU 1. The picture data in the line memory 7 is then converted into the "run-length" code, which is then encoded into compressed data before eventually being delivered to the line 20 through the data transmission control circuit 4, modem 5, and the NCU 6.

Next, the configuration of the automatic dialer signal transmitter is described below. Reference number 9 indicates the operation panel (keyboard) which is provided with digital keys and other functional keys. The digital keys perform the dial operation (abbreviated dial operation). Reference number 10 indicates the display unit. Reference number 11 indicates RAM that contains the abbreviated dial conversion table 11a, which converts the abbreviated dial signals into such signals dealing with normal dial numbers while the digital keys operate the abbreviated dial. Reference number 12 indicates the dial pulse generator circuit, which generates dial pulses for delivery to the service line 20 on receipt of normal dial signals converted by the abbreviated dial conversion table 11a.

A configuration such as described above is quite similar to those of the conventional automatic dialers provided for any facsimile units available today. However, the preferred embodiment of the present invention provides such a specific configuration described below. First, in addition to the abbreviated dial conversion table 11a, RAM 11 is specifically provided with the direct number area 11b that stores the dial numbers (direct numbers) of specific addressees requiring the most frequent calls. The abbreviated dial conversion table 11a classifies the incoming dial signals into abbreviated numbers before converting these into dial numbers corresponding to the abbreviated number data being input by operation of the digital keys on the operation panel 9, and as a result, all the normal dial numbers are stored in the abbreviated dial conversion table 11a of RAM 11 by operation of the digital keys. In other words, as soon as the abbreviated number data is entered by operation of the digital keys, a specific area classified by the abbreviated dial conversion table 11a is selected before dial numbers are eventually registered. When the dial number is input by operation of the digital keys, the dial number is stored in the selected area. At the same time, the input dial number is shown in display 10. As in the above operations, the direct number area 11b introduces the dial number (direct number) of such specific addressees requiring the most frequent communications for storage. In other words, the direct number area 11b is selected by operating a specific key on the operation panel 9. Next, when the dial number is input by operation of the digital keys, the direct number area 11b stores the input dial number. Simultaneously, the input dial number is shown in display 10. RAM 11 is provided with a counter memory 11c for storing the number of the call service rounds and also a timer memory 11d for storing a specific period of time in accordance with a number of specific pulses. Counter memory 11c monitors the number of repeated attempted calls at specific intervals specified in the timer storage 11d when the addressee's line is busy. In this preferred embodiment, a maximum of 3 rounds can be tried. If the addressee's line is still busy, the call operation is discontinued. Timer memory 11d provides the preset time for activating trial calls 3 times at specific intervals. In the preferred embodiment, the automatic dialer calls up the addressee at 3 minutes intervals. RAM 11 constantly receives power so as to prevent the stored data from destruction.

Referring now to the flowchart of FIG. 2, operation of the automatic dialer embodied by the present invention and set in a facsimile unit in FIG. 1 is described below.

Before starting to transmit written messages, the operator first inputs either the dial number or the abbreviated number of a specific addressee by operating the digital keys on the operation panel 9. Concretely, before entering the dial number, the operator first operates a specific functional key needed to input the dial number, followed by entry of the dial number by operating the digital keys. If the abbreviated number should be used, two-figure numerals are input through the digital keys without operating any functional key. Either the dial number or the abbreviated number thus entered is simultaneously shown in display 10 to allow the operator to visibly check the input number (FIG. 2 steps n1 and n2). The CPU 1 then correctly identifies whether the input is abbreviated number, or not. If abbreviated, the CPU 1 then selects a proper area from the abbreviated dial conversion table 11a of RAM 11, then reads the preregistered dial number, and finally the read-out dial number is shown in display 10 (FIG. 2 steps n4 and n5).

The operator then operates the data transmission key continuously in order that the dial number which is either chosen or directly input can be delivered to the dial pulse generator circuit 12 to allow a specific dial pulse corresponding to the dial number to be transmitted from the line 12 to the line 20. The CPU 1 then checks to see if there is an answer-back signal (CED tone) from the addressee. If no answerback signal is received yet, the CPU 1 then identifies that the addressee is busy or doesn't answer, and then activates a timer using timing storage 11d (FIG. 2 steps n6, n7, n9, and n10). After passing 3 minutes, the timer turns off, and then the CPU 1 reduces the value of counter storage 11c so that it becomes 1 less than the initial value "2", and then activates the repeat call operation which causes the procedure to enter steps n11, n12, and then n7. The repeat call operation causes the same operation as above to be repeated 3 times until the value of counter storage 11c becomes "0". If the CPU 1 still cannot receive the answerback signal from the addressee until 3 calls are completed, the CPU 1 then sets the counter storage 11c to a value "2" before eventually stopping the signal transmission. The automatic dialer performs notification or recording of such functional operations as just mentioned, thus providing a convenience for the operator.

Figure 2:
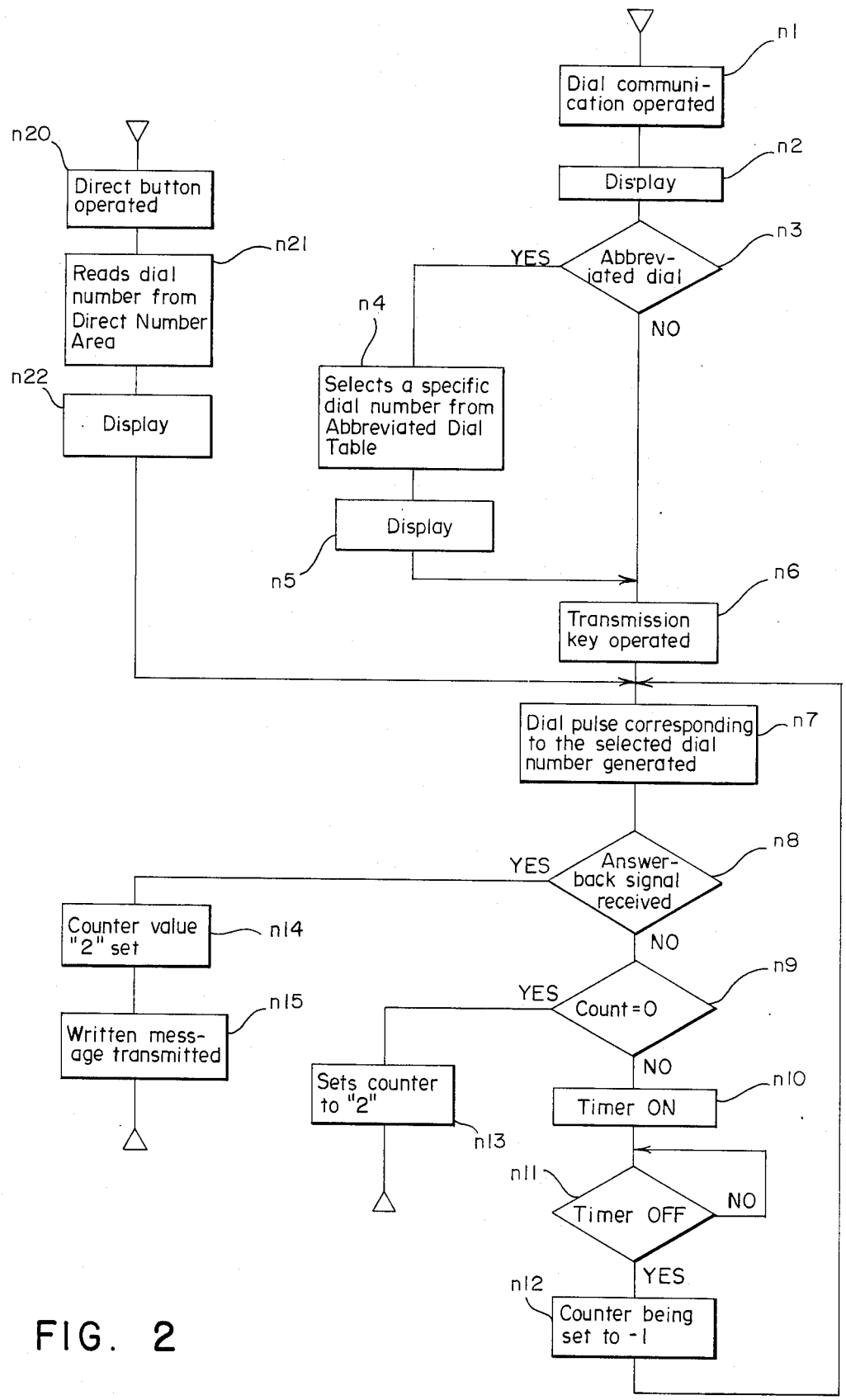
FIG. 2 shows the flowchart describing the operation of the automatic dialer shown in FIG. 1.

Conversely, if the CPU 1 receives the answerback signal from the addressee, the CPU 1 first sets the counter storage 11c at a value "2", and then activates a conventional transmission of written messages through the facsimile unit (FIG. 2 steps n3 - n14 - n15).

Next, when a message should be transmitted to a specific addressee registered in advance in the direct number area 11b of RAM 11 requiring frequent communications, the operator then operates the direct button on the operation panel 9 (FIG. 2 step n20). As soon as the direct button is operated, the direct number area 11b of RAM 11 is selected, thus allowing the dial number to be read out, and simultaneously, the read-out dial number is shown in display 10 (FIG. 2 steps n21 - n22).

Then, the flowchart operations from step n7 on are sequentially performed in the same manner as described above. In other words, in this case, written messages can be automatically transmitted to the addressee when the operator merely operates the direct button, which is called "one-touch" operation. Therefore, the operator should merely operate the direct button and then he can freely leave the facsimile unit, and he doesn't need to correctly remember the dial number of the addressee all the time. The preferred embodiment of the present invention also allows the direct number area 11b to conveniently store all the dial numbers of specific addressees using the binary codes and other various types of memory data as well.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A facsimile machine for transmitting data over a public telephone line comprising:

means for reading a document original to be transmitted and for developing data representative of the pattern present thereon;

line memory means for temporarily storing said data in a line by line fashion;

data interface means for supplying said data to said public telephone line, said data interface means further receiving data provided from a remote facsimile machine on said public telephone line;

said line memory means further temporarily storing said data received from said public telephone line in a line by line fashion;

data recording means for printing an image recovered from said data received from said public telephone line;

a central processing unit, operatively connected to said means for reading, said line memory means, said data interface means and said data recording means, for controlling the transfer of said data between line memory means and said data interface means and between said line memory means and said means for reading and data recording means in accordance with a control program;

permanent memory means, operatively connected to said central processing unit for storing said control program;

dialing means operatively connecting between said central processor unit and said public telephone line, for establishing connections with a said remote facsimile machine;

operation panel means including a keyboard for entering commands to said facsimile machine including telephone numbers to be dialed, said operator panel means being operatively connected to said central processing unit;

random access memory means, operatively connected to said central processing unit, for storing telephone numbers of said remote facsimile machine, said random access memory means having a plurality of memory areas, selected ones of said telephone numbers being stored in locations within an abbreviated dial conversion table in one of said memory areas of said random access memory means, said selected ones of said telephone numbers are defined by abbreviated code numbers, said code numbers and said telephone numbers being provided to said random access memory means from said operation panel means, other ones of said telephone numbers stored in a directed number area in a second one of said plurality of memory areas in said random access memory means, said random access memory means further storing a dial repeat count number and a dial repeat interval time, said selected ones of said telephone numbers being accessed by operation of abbreviation code keys in said operation panel means and said other ones of said telephone numbers being accessed by operation of a direct number key on said operation panel means;

said dialing means, in cooperation with said central processing unit, detecting a busy signal at said remote facsimile machine and being responsive to said dial repeat count and dial repeat interval time stored in said random access memory means to automatically redial the said telephone number of said remote facsimile machine up to a maximum number of times specified by said dial repeat count number at intervals specified by said dial repeat interval time, said dialing means determining when said remote facsimile machine answers and enabling transmitting of data by said data interface means in response thereto, operation of said dialing means being initiated by one of an operation of a transmission key upon said operation panel means and an operation of said direct number key, transmission being automatically initiated once one of said telephone numbers is accessed and dialed and said remote terminal has answered.

2. The machine of claim 1 further comprising display means for displaying said telephone number being dialed and said abbreviated code number indicative thereof.

3. The machine of claim 2 wherein said abbreviated code number is a two digit number.

* * * * *